United States Patent
Kim et al.

(10) Patent No.: US 8,652,554 B2
(45) Date of Patent: *Feb. 18, 2014

(54) METHOD FOR PREPARING INSTANT DRIED SCORCHED RICE WITH EXCELLENT RESILIENCE

(75) Inventors: Jong-Wook Kim, Seoul (KR); Chang-Yong Lee, Seoul (KR)

(73) Assignee: CJ Cheiljedang Corp., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/142,777

(22) PCT Filed: Dec. 28, 2009

(86) PCT No.: PCT/KR2009/007824
§ 371 (c)(1),
(2), (4) Date: Oct. 28, 2011

(87) PCT Pub. No.: WO2010/077034
PCT Pub. Date: Jul. 8, 2010

(65) Prior Publication Data
US 2012/0040071 A1    Feb. 16, 2012

(30) Foreign Application Priority Data
Dec. 30, 2008    (KR) .................. 10-2008-0137557

(51) Int. Cl.
*A23L 1/168*    (2006.01)
(52) U.S. Cl.
USPC ........... 426/443; 426/449; 426/464; 426/506; 426/507; 426/615; 426/618; 426/629
(58) Field of Classification Search
USPC ......... 426/443, 449, 464, 506, 507, 615, 618, 426/629
See application file for complete search history.

(56) References Cited

FOREIGN PATENT DOCUMENTS

| KR | 10-1974-0000443 | 12/1974 |
|---|---|---|
| KR | 10-1986-0002968 | 5/1986 |
| KR | 10-1987-0000263 | 2/1987 |
| KR | 10-1989-0003693 | 9/1989 |
| KR | 10-1992-0009339 | 6/1992 |
| KR | 10-1993-0011900 | 7/1993 |
| KR | 10-1995-0011135 | 9/1995 |
| KR | 10-2001-0088502 | 9/2001 |
| KR | 10-2002-0063942 | 8/2002 |
| KR | 10-2002-0066398 | 8/2002 |
| KR | 10-2002-0071509 | 9/2002 |
| KR | 10-2003-0029532 | 4/2003 |
| KR | 20-0388017 | 6/2005 |

OTHER PUBLICATIONS

International Search Report mailed Sep. 3, 2010, directed to International Patent Application No. PCT/KR2009/007824; 4 pages.

*Primary Examiner* — Lien T Tran
(74) *Attorney, Agent, or Firm* — Morrison & Foerster LLP

(57) ABSTRACT

The present invention relates to a method for preparing instant dried scorched rice with excellent resilience, comprising washing a mixture of nonglutinous rice and glutinous rice, followed by soaking, adding polygonatum concentrate and rice starch, as a separate process, to the washed rice to prepare rice cooking water, followed by performing rice cooking to prepare cooked rice, mixing the cooked rice with purified water in a scorched rice forming apparatus to prepare scorched rice and grinding to prepare instant dried scorched rice. As the instant dried scorched rice prepared according to the method of the present invention has an internal texture having a developed network structure, and the scorched rice exhibits superior spreading and soft texture and the starch of the scorched rice is easily eluted to provide a predetermined turbidity, and to enrich the inherent flavor as well, and also the scorched rice soup exhibits superior qualities, comparable to traditional homemade scorched rice soup, and can be stored for a long period of time, thus being considerably useful for the food industry.

5 Claims, 3 Drawing Sheets

METHOD FOR PREPARING INSTANT DRIED SCORCHED RICE WITH EXCELLENT RESILIENCE

TECHNICAL FIELD

The present invention relates to a method for preparing instant dried scorched rice with excellent resilience. More specifically, the present invention relates to a method for preparing instant dried scorched rice with excellent resilience, comprising washing a mixture of nonglutinous rice and glutinous rice, followed by soaking, adding polygonatum (Solomon's seal) concentrate and rice starch, as a separate process, to the washed rice to prepare rice cooking water, followed by performing rice cooking to prepare cooked rice, mixing the cooked rice with purified water in a scorched rice forming apparatus to prepare scorched rice and grinding to prepare instant dried scorched rice.

BACKGROUND ART

Generally, scorched rice soup (also called "Nurungji Tang" in Korean) is prepared by adding a predetermined amount of water to scorched rice formed after cooking rice and then boiling the mixture at 100° C. for 10 minutes or longer.

There are a variety of conventional methods for preparing scorched rice soup. For example, methods for preparing instant (precooked) scorched rice or dry-type scorched rice that can be eaten only after heating are disclosed in KR Patent Application Nos. 10-1974-1979, 10-1983-2843, 10-1984-6509, 10-1987-9919, 10-1990-18920, and 10-1991-22412. In addition, KR Patent Application No. 10-1993-934 discloses a method for preparing instant rice soup (also called "Sungnyung" in Korean) comprising steaming a rice or cereal mixture in an automatic rice cooker, molding scorched rice obtained thereby using a scorched rice molder, soaking the scorched rice in tepid water, followed by rapid freeze-drying such that water content is adjusted to 80 to 90 wt %, vacuum-drying, such that water content is adjusted to 5 wt % or less and vacuum packaging.

In addition, KR Patent Application No. 10-2003-9247 discloses concentrated rice soup which is concentrated, sterilized and packaged in order to obtain rice soup in home by adding hot water thereto, and KR Utility Model Application 20-2005-3671 discloses an instant rice soup product prepared by mixing water, polished rice and brown rice, homogeneously heating the mixture to a temperature of 140 to 180° C. to simultaneously perform steaming and roasting, and naturally drying.

The conventional dry-type scorched rice which can be eaten by adding boiling water thereto exhibits a deterioration in taste such as texture or flavor, as compared to homemade scorched rice soup. The dry-type scorched rice which can be eaten by adding water thereto, followed by boiling also has unsatisfactory qualities in terms of flavor and texture, although it exhibits superior quality as compared to the previous case.

Accordingly, the scorched rice soup prepared in accordance with a conventional method has disadvantages of being highly perishable and having poor taste.

As a result of a great deal of intensely repeated research and experiments to overcome the disadvantages, the inventors of the present invention discovered a method for preparing scorched rice which satisfies superior qualities such as taste, flavor and texture.

DISCLOSURE

Technical Problem

Therefore, the present invention has been made in view of the above problems, and it is one object of the present invention to provide a method for preparing instant dried scorched rice, wherein the network structure of product is developed, thus exhibiting remarkable spreading properties, superior texture, and unique flavor and taste.

Technical Solution

In accordance with an aspect of the present invention, the above and other objects can be accomplished by the provision of a method for preparing instant dried scorched rice, the method comprising: preparing cooked rice having water content of 68 to 78% by weight using nonglutinous rice and glutinous rice, as raw materials; adding 5~10% by weight (based on the weight of the cooked rice) of purified water to the cooked rice, followed by mixing, and heating the cooked rice using a heated hotplate (150~170° C.) to prepare scorched rice having a water content of 7~9%. The characteristics of the prepared scorched rice are confirmed.

The present invention provides a method for preparing instant dried scorched rice.

The method for preparing the instant dried scorched rice according to the present invention comprises the following steps: mixing nonglutinous rice with glutinous rice; washing the mixed rice and soaking the washed rice in water; adding polygonatum concentrate and rice starch to an extract obtained by hot water extraction of roasted rice, followed by sterilizing to prepare rice cooking water; adding the rice cooking water to the washed rice to prepare cooked rice; mixing the cooked rice with purified water, followed by heating in a scorched rice forming apparatus to prepare a scorched rice; and grinding the scorched rice to prepare instant dried scorched rice.

The term "nonglutinous rice" as used herein refers to rice obtained by milling brown rice to a milling degree of 11 or higher.

The term "dry-type scorched rice" refers to scorched rice having a water content of less than 7~9% by weight, obtained by washing polished rice with water, soaking the same in water for one hour, cooking rice having water content of 68~78% by weight in a rice cooker and molding the rice in a scorched rice forming apparatus.

The term "washing rice" as used herein refers to a process for washing rice.

The term "soaking" as used herein refers to a process of macerating rice.

Hereinafter, the method of the present invention will be described in detail according to respective steps with reference to FIG. 1.

First, as shown in FIG. 1, a mix ratio of nonglutinous rice and glutinuous rice is 8:2. The mixed rice is washed with purified water, starch and other impurities present on the surface of rice grains are removed, the washed rice is soaked in water for one hour, and the washed rice is placed in a container such as a fine wire sieve to remove water therefrom.

Then, separately, roasted rice is hot-water extracted using purified water at 80~90° C. for 30 minutes, mixing 1.2% by weight (based on rice cooking water) of polygonatum (Solomon's seal) and 1.5% by weight (based on the weight of rice cooking water) of rice starch with the extract, filtering the mixture and sterilizing the filtered material by a UV sterilizing method to prepare rice cooking water.

In addition, the washed rice is soaked in water for one hour, the rice cooling is performed in a rice cooker containing the previously manufactured rice cooking water at a condition of 100° C. for 40~50 minutes. At this time, the final rice has a water content of 68~78%.

Then, purified water of 5~10% (in comparison with an amount of cooked rice) is added to the cooked rice and mixed with each other.

The rice having increased water content by mixing with purified water is moved to a hotplate scorched rice forming apparatus heated at 150~170° C., spread flatly, and heated for 10~15 minutes to prepare a scorched rice having a water content of less than 7~9% by weight.

Next, the manufactured scorched rice is cooled down for 4 hours in a cleaning room at 25° C. so as not to change of water content any more.

Finally, the scorched rice is grinded by a constant size (10 mm×10 mm) to complete the preparations of instant dried scorched rice.

Advantageous Effects

The instant dried scorched rice prepared according to the method of the present invention has an internal texture having a developed network structure. Accordingly, when heated in water for rice cooking, the scorched rice exhibits superior spreading and soft texture. Also, the starch of the scorched rice is easily eluted to provide a predetermined turbidity and to enrich the inherent flavor of the scorched rice. Accordingly, the scorched rice soup of the present invention exhibits superior qualities to traditional homemade scorched rice soup and can be stored for a longer period of time, thus would be considerably useful for the food industry.

DESCRIPTION OF DRAWINGS

The above and other objects, features and other advantages of the present invention will be more clearly understood from the following detailed description taken in conjunction with the accompanying drawings, in which.

BEST MODE

Figure 1:
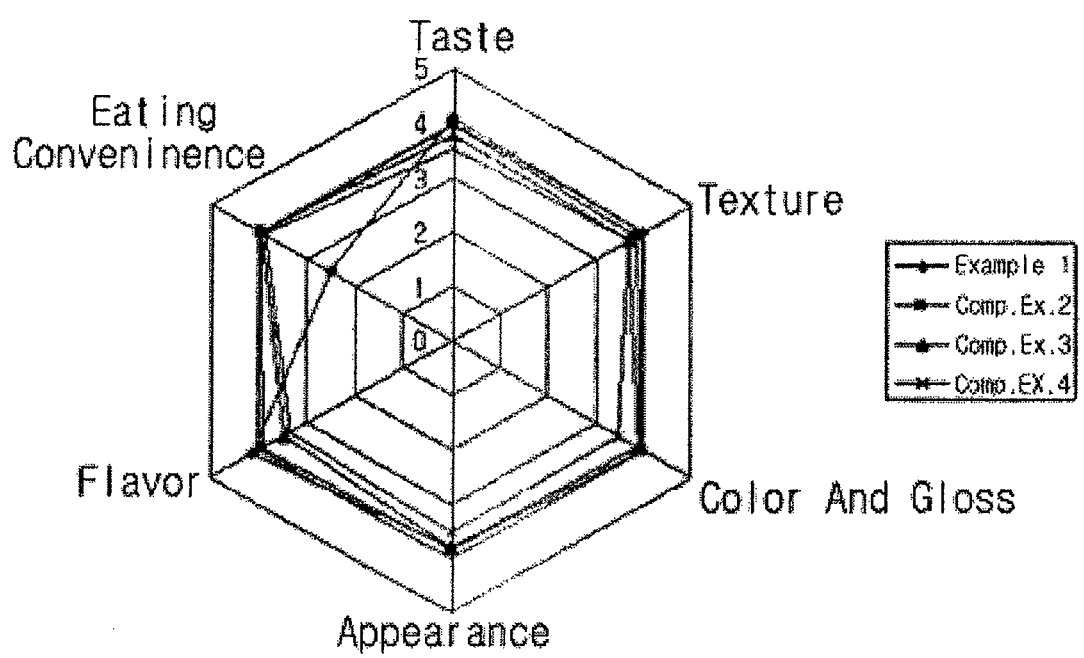
FIG. 1 is a graph illustrating the result of property test of an instant dried scorched rice prepared by an embodiment of the present invention.
Figure 2:
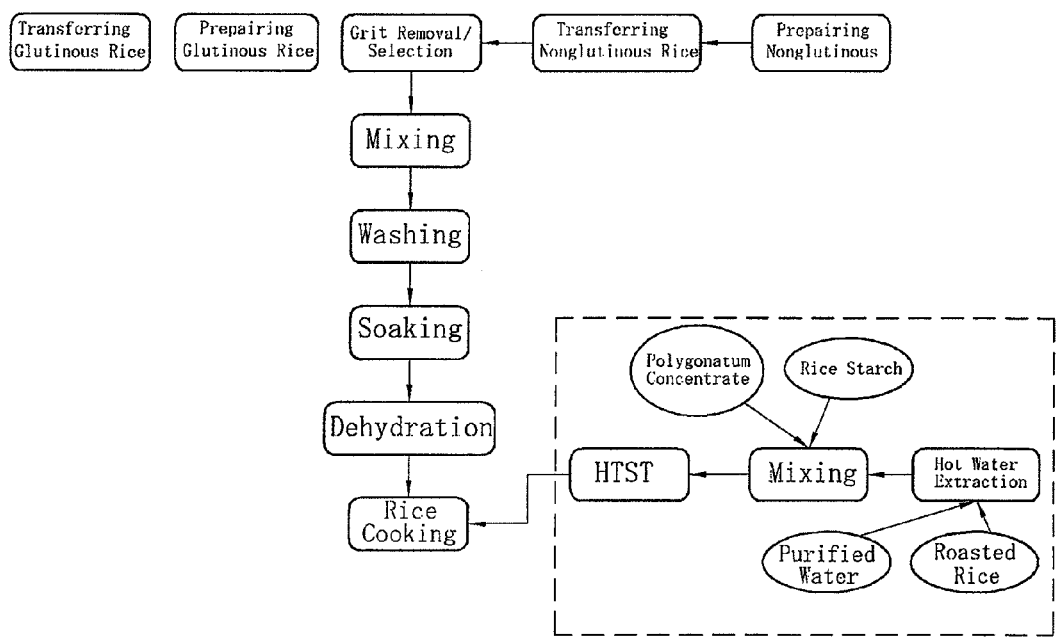
FIG. 2 is a flow chart illustrating a method for preparing an instant dried scorched rice according to the present invention.
Figure 3:
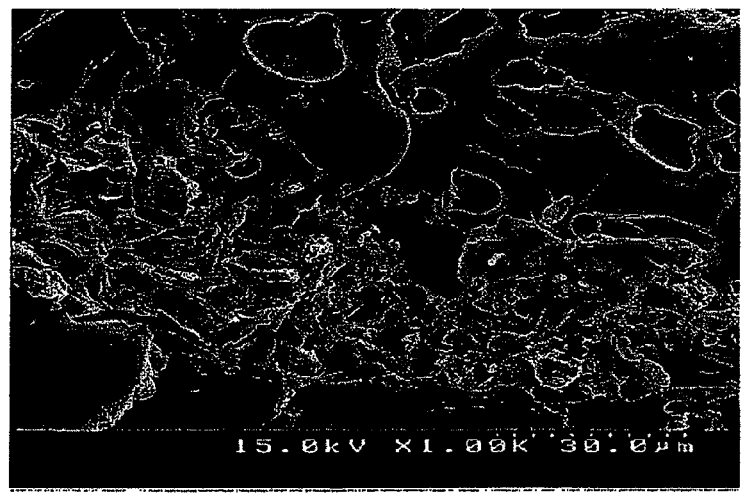
FIG. 3 is a microstructure's picture by SEM of a scorched rice prepared by a conventional method.
Figure 4:
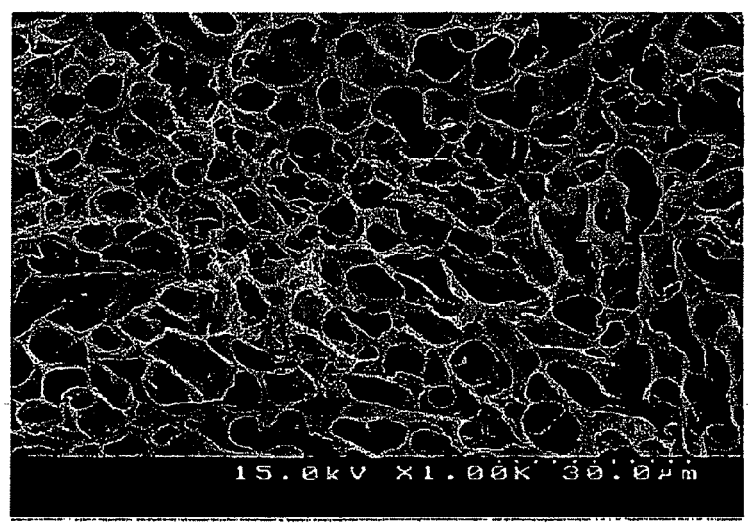
FIG. 4 is a microstructure's picture by SEM of a scorched rice prepared by the present invention.

Now, the present invention will be described in more detail with reference to the following Examples. These examples are only provided to illustrate the present invention and should not be construed as limiting the scope and spirit of the present invention.

EXAMPLE 1

200 g of polished rice was washed five times with water, soaked in water for 1 hour and placed in a fine wire sieve to remove moisture therefrom.

Then, as a separate process, a roasted rice is extracted by using purified water at 80~90° C. for 30 minutes, mixing 1.2% by weight (based on the weight of rice cooking water) of polygonatum (Solomon's seal) and 1.5% by weight (based on the weight of rice cooking water) of rice starch with the extract, filtering the mixture and sterilizing the filtered material by a UV sterilizing method to prepare rice cooking water.

330 g of rice cooking water was added to a rice cooker (100° C. for 30 minutes) to prepare cooked rice having a water content of 68~78%. Then, 100~150 g of purified water was added to the cooked rice, followed by mixing. Thereafter, the cooked rice was moved to a hotplate scorched rice forming apparatus heated at 150~170° C., spread flatly, and heated for 10~15 minutes to prepare a scorched rice having a water content of less than 7~9% by weight.

The resulting scorched rice was dried at room temperature (25° C.) for 4 hours and grinded to a predetermined size of width×length×height: 15 mm×10 mm×5 mm. 300 g of boiling water (100° C.) was added to 60 g of the grinded scorched rice and allowed to stand for 5 minutes to prepare scorched rice soup. The scorched rice soup was to be eaten.

COMPARATIVE EXAMPLE 1

200 g of polished rice was washed five times with water, soaked in water for 1 hour and placed in a fine wire sieve to remove moisture therefrom.

160 g of water was added to 200 g of the polished rice and the mixture was heated for 30 minutes to prepare scorched rice.

20 g of the scorched rice thus prepared, 20 g of cooked rice and 230 g of water were heated for 10 minutes to prepare scorched rice soup. The scorched rice soup was to be eaten.

COMPARATIVE EXAMPLE 2

200 g of polished rice was washed five times with water, soaked in water for one hour and placed in a fine wire sieve to remove moisture therefrom.

230 g of rice cooking water was added to a rice cooker (100° C. for 30 minutes) to prepare cooked rice having a water content of 55~60%. Then, 100~150 g of purified water was added to the cooked rice, followed by mixing. Thereafter, the cooked rice was moved to a hotplate scorched rice forming apparatus heated at 150~170° C., spread flatly, and heated for 10~15 minutes to prepare a scorched rice having a water content of less than 7~9% by weight.

The resulting scorched rice was dried at room temperature (25° C.) for 4 hours and grinded to a predetermined size of width×length×height: 15 mm×10 mm×5 mm. 300 g of boiling water (100° C.) was added to 60 g of the grinded scorched rice and allowed to stand for 5 minutes to prepare scorched rice soup. The scorched rice soup was eaten.

COMPARATIVE EXAMPLE 3

200 g of polished rice was washed five times with water, soaked in water for 1 hour and placed in a fine wire sieve to remove moisture therefrom.

The cooked rice was moved to a hotplate scorched rice forming apparatus heated at 120~130° C., spread flatly, and heated for 20~30 minutes to prepare a scorched rice having a water content of less than 7~9% by weight.

The resulting scorched rice was dried at room temperature (25° C.) for 4 hours and grinded to a predetermined size of width×length×height: 15 mm×10 mm×5 mm. 300 g of boiling water (100° C.) was added to 60 g of the grinded scorched rice and allowed to stand for 5 minutes to prepare scorched rice soup. The scorched rice soup was eaten.

EXPERIMENTAL EXAMPLE 1

Sensory test was performed for scorched rice soups prepared in Example 1 and comparative Examples 1 to 3. The results thus obtained are shown in Table 1 below and FIG. 1.

TABLE 1

|  | Taste | Texture | Color and gloss | Appearance | Flavor | Eating convenience |
|---|---|---|---|---|---|---|
| Ex. 1 | 3.95 | 3.81 | 3.95 | 3.83 | 3.92 | 3.95 |
| Com. 1 | 4.12 | 3.95 | 3.84 | 3.79 | 4.15 | 2.54 |
| Com. 2 | 3.77 | 3.69 | 3.87 | 3.80 | 3.45 | 3.98 |
| Com. 3 | 3.55 | 3.67 | 3.47 | 3.49 | 3.32 | 3.89 |
| P-value | **0.01 | **0.02 | **0.03 | **0.031 | **0.01 | **0.00 |

**There is significant difference in CI 95 wt %
*5-grade scale is used as the score of the test. That is, an evaluation was made based on the following scores: very good: 5, good: 4, medium: 3, bad: 2, very bad: 1

Comparative Example 1 shows scorched rice soup prepared by a traditional method, exhibited in general inherent unique aromatic flavor of rice soup, superior texture of rice grains and the most superior inherent taste of rice soup.

Example 1 shows scorched rice soup in the present invention, eaten after adding boiling water to instant dry-type scorched rice, which exhibits high consumer taste in terms of superior convenience. Also, in color and gloss, the scorched rice soup of the present invention is superior to the scorched rice soup prepared by the conventional method. Also, the scorched rice has the excellent resilience property to boiling water and exhibits superior spreading of texture, turbidity and the flavor of the scorched rice soup in comparison with comparative examples 2 and 3.

Comparative Example 2 shows scorched rice soup eaten after adding boiling water, which exhibits the same consumer's taste as Example 1 in convenience. However, it can be seen that the scorched rice soup exhibits a hard and tough texture due to insufficient gelatinization and considerably deteriorated flavor, as compared to the unique flavor of the present invention.

Comparative Example 3 is more inferior to comparative example 2 in quality, exhibits a hard texture due to the lowest resilience and the slight flavor of scorched rice.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for preparing instant dried scorched rice comprising:
    mixing nonglutinous rice with glutinous rice;
    washing the mixed rice and soaking the washed rice in water;
    contacting roasted rice with purified water at 80~90° C. such that an extract comes out of the roasted rice and into the water;
    adding polygonatum concentrate and rice starch to the water with the extract from the roasted rice, followed by sterilizing the water with the extract to prepare rice cooking water;
    adding the rice cooking water to the washed rice to prepare cooked rice;
    mixing the cooked rice with purified water, followed by heating in a scorched rice forming apparatus to prepare a scorched rice; and
    grinding the scorched rice to prepare instant dried scorched rice.

2. The method according to claim 1, wherein a mix ratio of the nonglutinous rice and glutinous rice is 4:1.

3. The method according to claim 1, wherein the rice cooking water preparing step comprises the following steps:
    extracting the contacted roasted rice with purified water for 30 minutes to make the water with the extract from the roasted rice;
    mixing polygonatum concentrate and rice starch into the water with the extract from the roasted rice;
    filtering the mixture and sterilizing the filtrate by UV to prepare rice cooking water.

4. The method according to claim 1, wherein in the cooked rice preparing step, the cooked rice has a water content of 68~78%.

5. The method according to claim 1, wherein the scorched rice preparing step comprises the following steps:
    adding the purified water of 5~10% by weight of cooked rice to the cooked rice, and heating the cooked rice by a hotplate scorched rice forming apparatus at 150~170° C. for 10~15 minutes.

* * * * *